(12) United States Patent
Jin et al.

(10) Patent No.: US 8,054,242 B2
(45) Date of Patent: Nov. 8, 2011

(54) LIQUID CRYSTAL DISPLAY DEVICE AND METHOD OF DRIVING THE SAME

(75) Inventors: Hyun-Suk Jin, Gupo-si (KR); Joon-Kyu Park, Annyang-si (KR); Hyung-Seok Jang, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 889 days.

(21) Appl. No.: 11/446,157

(22) Filed: Jun. 5, 2006

(65) Prior Publication Data

US 2007/0146259 A1    Jun. 28, 2007

(30) Foreign Application Priority Data

Dec. 23, 2005  (KR) .................. 10-2005-0128834

(51) Int. Cl.
*G09G 5/00* (2006.01)
(52) U.S. Cl. .................... 345/4; 345/87; 345/9
(58) Field of Classification Search ............ 345/87, 345/9
See application file for complete search history.

(56) References Cited

U.S. PATENT DOCUMENTS

| | | | | |
|---|---|---|---|---|
| 5,285,298 A * | 2/1994 | Kaneko et al. | ................ | 349/20 |
| 5,404,235 A * | 4/1995 | Okada | .............. | 345/87 |
| 5,917,562 A * | 6/1999 | Woodgate et al. | ............. | 349/15 |
| 5,936,596 A * | 8/1999 | Yoshida et al. | ................... | 345/9 |
| 6,211,930 B1 * | 4/2001 | Sautter et al. | ................... | 349/66 |
| 6,215,542 B1 * | 4/2001 | Lee et al. | ...................... | 349/143 |
| 6,445,434 B2 * | 9/2002 | Takato et al. | ................. | 349/123 |
| 6,765,545 B2 * | 7/2004 | Son et al. | ........................ | 345/7 |
| 7,068,336 B2 * | 6/2006 | Oh et al. | ........................ | 349/123 |
| 7,400,367 B2 * | 7/2008 | Matsushima | .................. | 349/76 |
| 2005/0007298 A1 * | 1/2005 | Sato et al. | ...................... | 345/1.3 |
| 2005/0243265 A1 * | 11/2005 | Winlow et al. | ................ | 349/178 |
| 2006/0191177 A1 * | 8/2006 | Engel | .............................. | 40/453 |

FOREIGN PATENT DOCUMENTS

| | | |
|---|---|---|
| CN | 1702517 | 11/2005 |
| GB | 2405516 A * | 3/2005 |
| GB | 2405546 A * | 3/2005 |
| GB | 2433640 | 6/2007 |
| JP | 11-331876 | 11/1999 |
| JP | 2005-173536 | 6/2005 |
| JP | 2005-173540 | 6/2005 |
| JP | 2005-196162 | 7/2005 |
| JP | 2006-184859 | 7/2006 |

\* cited by examiner

*Primary Examiner* — Richard Hjerpe
*Assistant Examiner* — Dorothy Harris
(74) *Attorney, Agent, or Firm* — McKenna Long & Aldridge, LLP (57) ABSTRACT

A liquid crystal display device including a main cell comprising a first substrate having a gate line, a data line, a thin film transistor and a pixel electrode; a second substrate facing the first substrate and having a black matrix and a color filter layer; and a first liquid crystal layer between the first and second substrates; and a switching cell over the main cell, the switching cell comprising a third substrate having a plurality of first electrodes; a fourth substrate facing the third substrate and having a second electrode; and a second liquid crystal layer between the third and fourth substrates.

21 Claims, 9 Drawing Sheets

LIQUID CRYSTAL DISPLAY DEVICE AND METHOD OF DRIVING THE SAME

The present invention claims the benefit of Korean Patent Application No. 2005-0128834 filed on Dec. 23, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to a liquid crystal display (LCD) device module having two main viewing angles and a method of driving the liquid crystal display (LCD) device.

2. Discussion of the Related Art

In general, a liquid crystal display (LCD) device includes two substrates facing and spaced apart from each other and a liquid crystal layer interposed between the two substrates. Liquid crystal molecules in the liquid crystal layer have optical anisotropy and polarizability, and are aligned with directional characteristics resulting from their long, thin shapes. The alignment direction of the liquid crystal molecules can be controlled by applying an electric field thereto. Accordingly, a desired image can be obtained by refracting and transmitting incident light and controlling the electric field applied to a group of liquid crystal molecules within particular pixel regions. In addition, active matrix liquid crystal display (AM-LCD) devices, where thin film transistors (TFTs) and pixel electrodes connected to the TFTs are arranged in a matrix, have been widely used because of their high resolution and superiority in displaying moving images.

Figure 1:
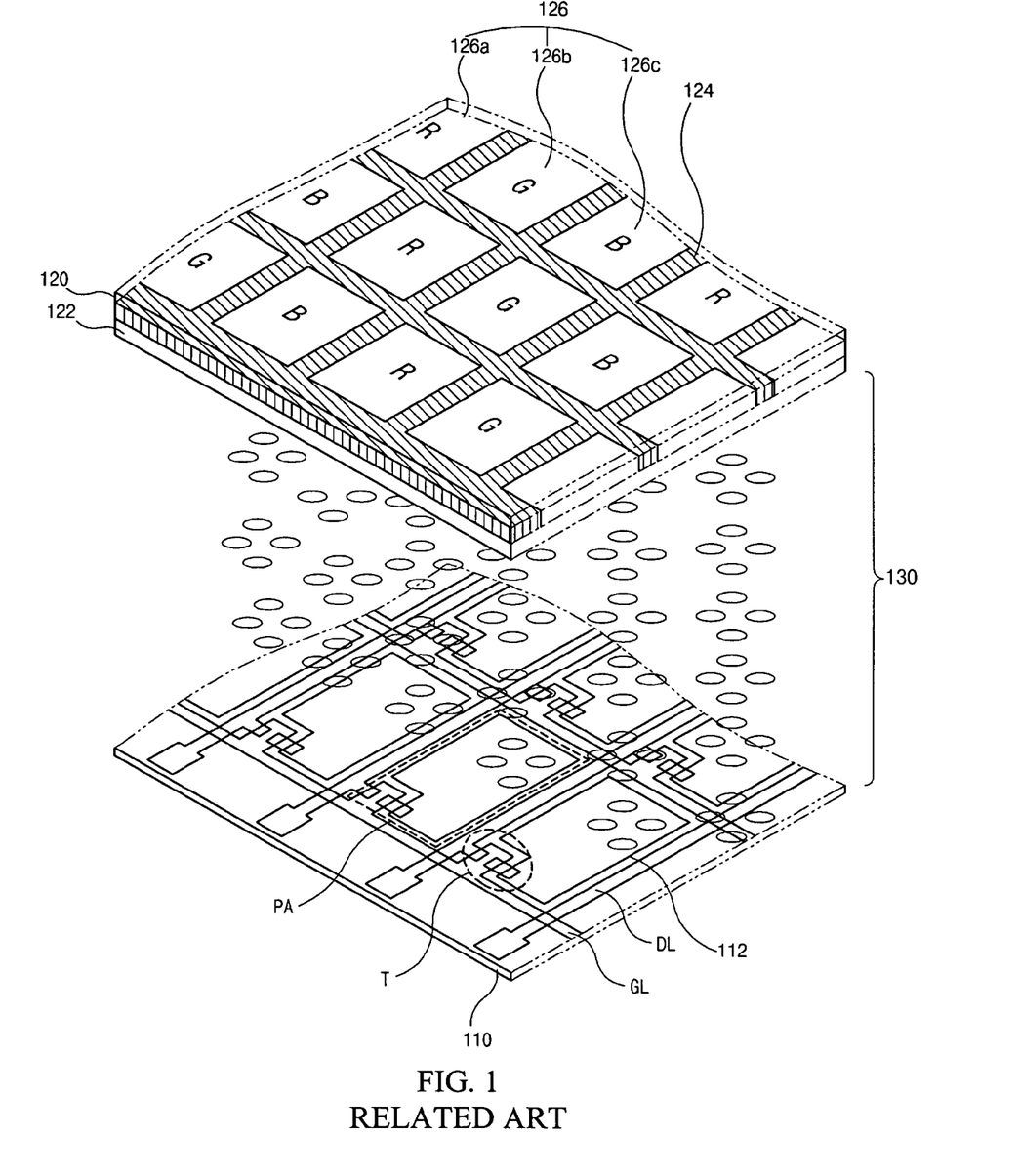
FIG. 1 is an exploded perspective view of a liquid crystal display device according to the related art.

FIG. 1 is an exploded perspective view of a liquid crystal display device according to the related art. In FIG. 1, a liquid crystal display (LCD) device includes first and second substrates 110 and 120, and a liquid crystal layer 130 therebetween. A gate line "GL" and a data line "DL" are formed on an inner surface of the first substrate 110. The gate line "GL" and the data line "DL" cross each other to define a pixel region "PA." A thin film transistor (TFT) "T" is connected to the gate line "GL" and the data line "DL." In addition, a pixel electrode 112 connected to the TFT "T" is formed in the pixel region "PA." A black matrix 124 is formed in an inner surface of the second substrate 120. A color filter layer 126 including red, green and blue color filters 126a, 126b and 126c is formed on the black matrix 124 and a common electrode 122 is formed on the color filter layer 126. The pixel electrode 112 and the common electrode 122 are formed of a transparent conductive material such as an indium-tin-oxide (ITO) and indium-zinc-oxide (IZO). When the TFT "T" is turned on, the liquid crystal layer 130 between the pixel electrode 112 and the common electrode 122 is rearranged according to an image signal applied to the pixel electrode 112 and light transmittance is adjusted according to the rearrangement of the liquid crystal layer 130. As a result, a required image is displayed.

In the LCD device of FIG. 1, since the liquid crystal layer 130 is driven by a vertical electric field generated between the pixel electrode 112 and the common electrode 122, the LCD device has high transmittance and high aperture ratio. However, when a voltage is applied to a liquid crystal layer 130 having a horizontal arrangement where liquid crystal molecules in upper and lower portions are twisted by 90°, the liquid crystal molecules are rearranged to have a polarization value of 90°. As a result, contrast ratio and brightness vary extremely according to a viewing angle and a wide viewing angle is seldom obtained.

To solve the above problems, various LCD devices such as an in-plane switching (IPS) mode LCD device, a fringe field switching (FFS) mode LCD device and a vertical alignment (VA) mode LCD device are suggested. In the IPS mode LCD device, the liquid crystal layer is adjusted using a horizontal electric field. The FFS mode LCD device is suggested for improving aperture ratio and transmittance of the IPS mode LCD device. In the VA mode LCD device, the ordinary axis of the liquid crystal molecule is aligned along a direction perpendicular to substrates.

Figure 2A:
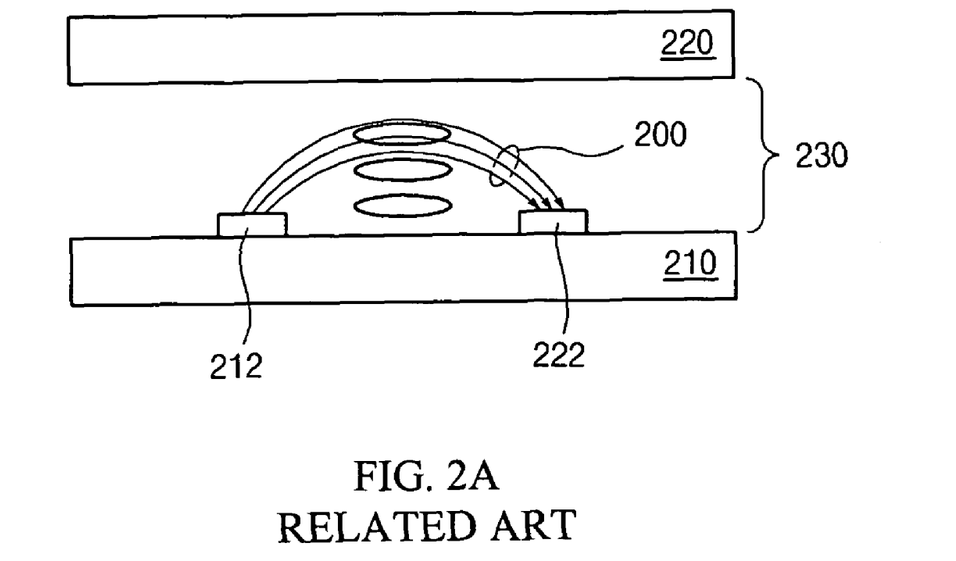
FIGS. 2A to 2C are cross-sectional views showing an IPS mode LCD device, an FFS mode LCD device and a VA mode LCD device, respectively, according to the related art.
Figure 2B:
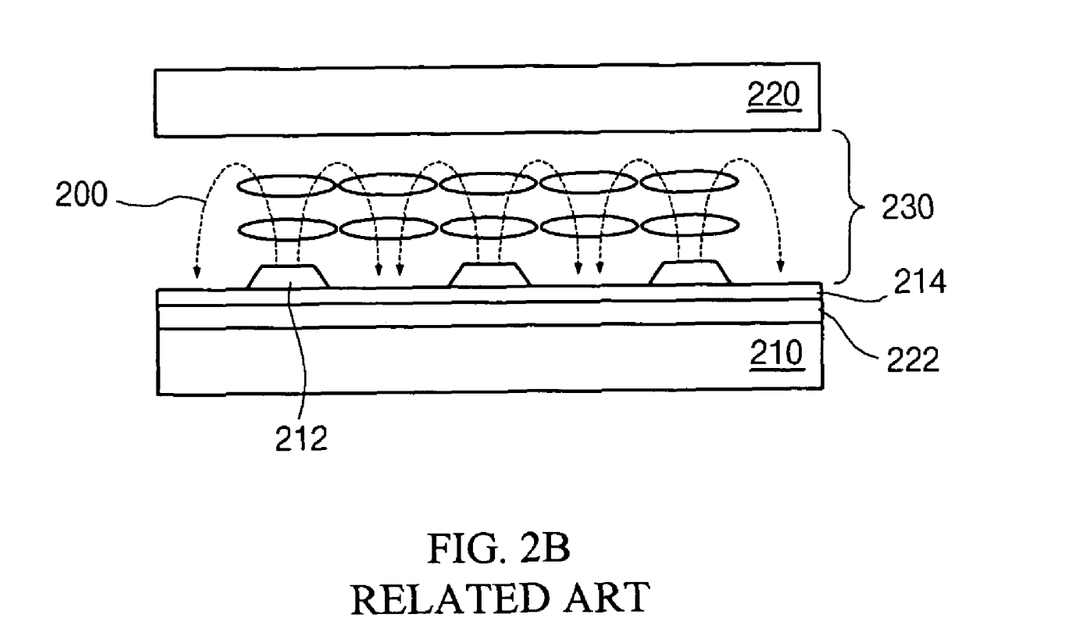
Figure 2C:
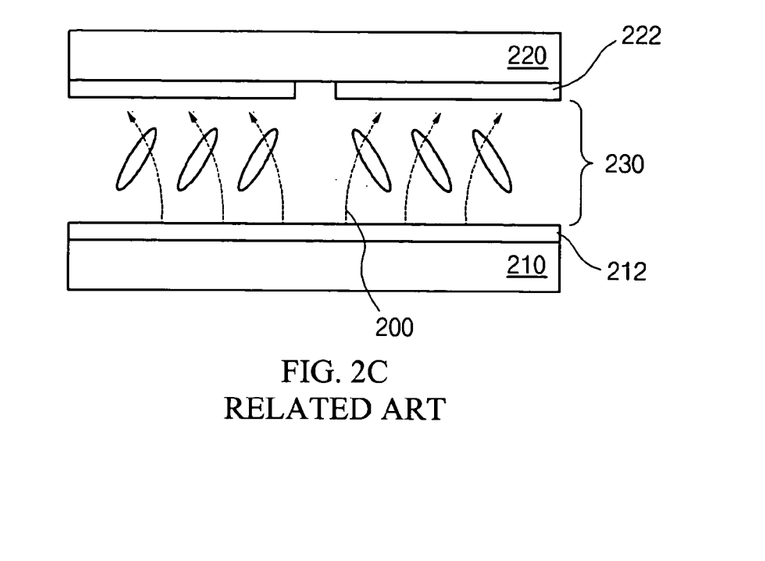

FIGS. 2A to 2C are cross-sectional views showing an IPS mode LCD device, an FFS mode LCD device and a VA mode LCD device, respectively, according to the related art. As shown in FIG. 2A, an IPS mode LCD device includes a first substrate 210, a second substrate 220 and a liquid crystal layer 230 between the first and second substrates 210 and 220. A pixel electrode 212 and a common electrode 222 are formed on the first substrates 210, and liquid crystal molecules in the liquid crystal layer 230 are arranged along a horizontal electric field 200 between the pixel electrode 212 and the common electrode 222. Since variation in refractive index according to a viewing angle is relatively small, a viewing angle is improved. However, aperture ratio and brightness are reduced. To improve the disadvantages of an IPS mode LCD device, the FFS mode LCD device is suggested.

In FIG. 2B, an FFS mode LCD device includes a first substrate 210, a second substrate 220 and a liquid crystal layer 230 between the first and second substrates 210 and 220. A common electrode 222 having a plate shape is formed in a pixel region on the first substrate 210. An insulating layer 214 is formed on the common electrode 222, and a plurality of pixel electrodes 212 are formed on the insulating layer 214. The plurality of pixel electrodes 212 are parallel to and spaced apart from each other. Since a horizontal electric field is generated in a gap having several angstroms (Å) between the common electrode 222 and the pixel electrode 212, the horizontal electric field has a strong intensity. In addition, since liquid crystal molecules over the common electrode 222 are arranged along the horizontal electric field, aperture ratio and brightness are improved. When the common electrode 222 is formed to have a bar shape, the common electrode 222 is disposed very close to the pixel electrode 212

In FIG. 2C, a VA mode LCD device includes a first substrate 210, a second substrate 220 and a liquid crystal layer 230 between the first and second substrates 210 and 220. A pixel electrode 212 is formed on the first substrate 210, and a common electrode 222 is formed on the second substrate 220. Liquid crystal molecules in the liquid crystal layer 230 are vertically aligned. In addition, a pixel region is divided into domains having main viewing angles different from each other. This multi-domain structure is obtained by a slit or a protrusion in the common electrode 222. Since a vertical electric field is distorted due to the slit or the protrusion, the VA mode LCD device has a multi-domain structure.

Since an IPS mode LCD device, an FFS mode LCD device and a VA mode LCD device have a wide viewing angle, an identical image having a high display quality are displayed to users along various viewing angles. When the users along various viewing angles want to watch different images, a plurality of LCD devices are required. For example, when an LCD device is disposed at a central portion of a car, a driver may look forward to watching an image regarding a car navigation system (CNS) and a passenger may look forward to watching an image regarding a movie or a broadcast. However, a plurality of LCD devices cause increase in space and cost.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device having two viewing angles and a method of driving the liquid crystal display device.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a main cell comprising: a first substrate having a gate line, a data line, a thin film transistor and a pixel electrode; a second substrate facing the first substrate and having a black matrix and a color filter layer; and a first liquid crystal layer between the first and second substrates; and a switching cell over the main cell, the switching cell comprising: a third substrate having a plurality of first electrodes; a fourth substrate facing the third substrate and having a second electrode; and a second liquid crystal layer between the third and fourth substrates.

In another aspect, a method of driving a liquid crystal display device includes: simultaneously displaying first and second images through a main cell; and forming a transmissive area and a blocking area in a switching cell located over the main cell, the transmissive area and the blocking area being alternately arranged with each other, wherein the first and second images have different main viewing angles from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 3A:
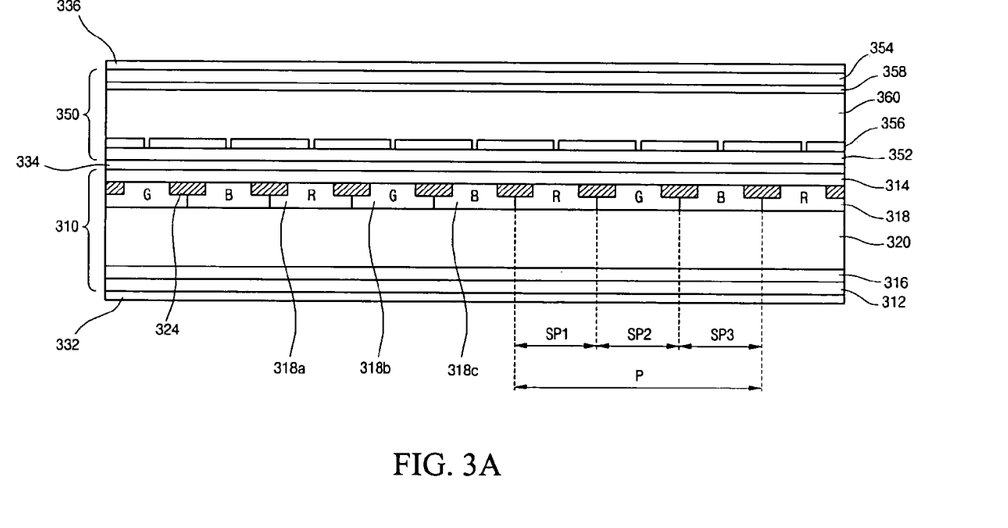
FIG. 3A is a cross-sectional view showing a liquid crystal display device according to an embodiment of the present invention.
Figure 3B:
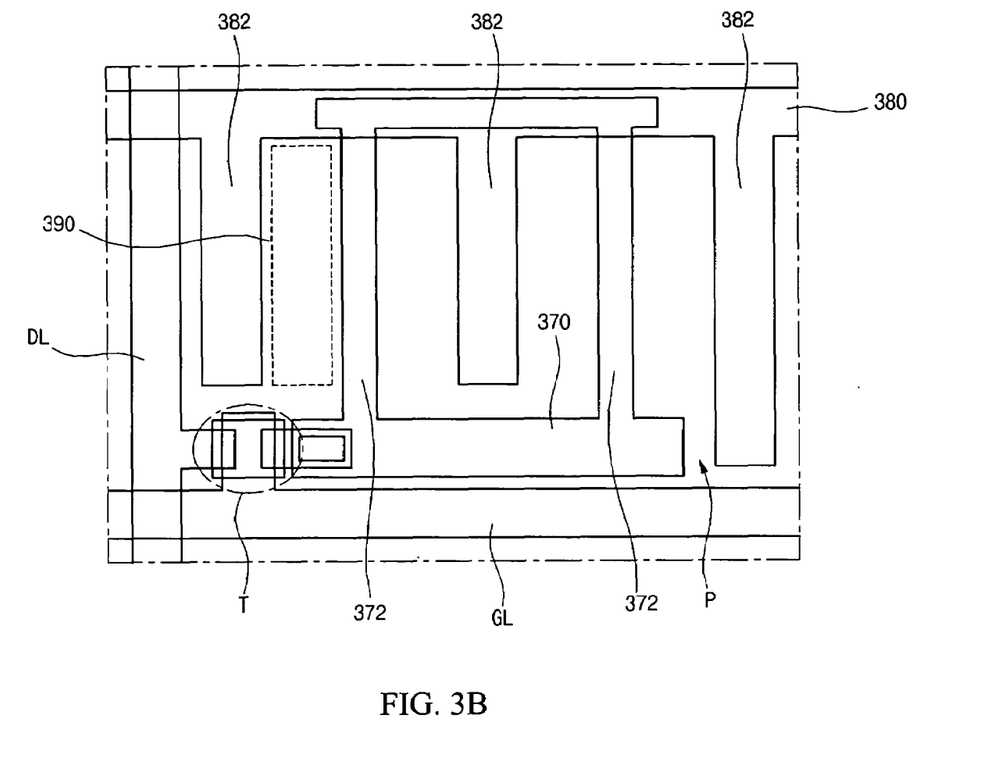
FIG. 3B is a plan view showing a main cell of a liquid crystal display device according to an embodiment of the present invention.

FIG. 3A is a cross-sectional view showing a liquid crystal display device according to an embodiment of the present invention, and FIG. 3B is a plan view showing a main cell of a liquid crystal display device according to an embodiment of the present invention.

In FIGS. 3A and 3B, an LCD device includes a main cell 310 and an switching cell 350. The main cell 310 displays a first image and a second image at the same time, and the switching cell 350 adjusts a main viewing angle of the first and second images. The main cell 310 includes a first substrate 312, a second substrate 314 and a first liquid crystal layer 320 between the first and second substrates 312 and 314. An array layer 316 on the first substrate 312 includes a gate line "GL," a data line "DL," a common line 380, a thin film transistor (TFT) "T," a plurality of common electrodes 382 and a plurality of pixel electrodes 372. The gate line "GL" crosses the data line "DL" to define a pixel region "P" including first, second and third sub pixel regions "SP1," "SP2" and "SP3." The common line 380 is spaced apart from and parallel to the gate line "GL," and the TFT "T" is connected to the gate line "GL" and the data line "DL." The plurality of common electrodes 382 extend from the common line 380, and the plurality of pixel electrodes 372 extend from a pixel connection line 370 connected to the TFT "T." The plurality of pixel electrodes 372 are alternately disposed with the plurality of common electrodes 382 in the pixel region "PA." The plurality of pixel electrodes 372 and the plurality of common electrodes 382 may have a bent portion such as in a chevron shape. A horizontal electric field is generated in a separation space between adjacent pixel and common electrodes 372 and 382. Accordingly, the first liquid crystal layer 320 in the separation space is driven by the horizontal electric field and the separation space functions as a substantial aperture area.

A black matrix 324 is formed on the second substrate 314, and a color filter layer 318 having first, second and third color filters 318a, 318b and 318c is formed on the black matrix 324. The first, second and third color filters 318a, 318b and 318c may be red (R), green (G) and blue (B) color filters, and each color filter corresponds to the sub pixel region "SP1," "SP2" and "SP3." Even though the first, second and third color filters 318a, 318b and 318c are sequentially arranged in this embodiment, pairs of the first, second and third color filters may be sequentially arranged in another embodiment. For example, the first color filter 318a, the first color filter 318a, the second color filter 318b, the second color filter 318b, the third color filter 318c and the third color filter 318c may be sequentially arranged. In addition, the color filter layer 318 may further include a white sub color filter.

When the first and second images are displayed in the main cell 310 at the same time, data for the first and second images may be alternately supplied to the main cell 310. For example, the data for first and second images may be alternately supplied by the sub pixel region or by the pixel region.

Even though the main cell 310 has an IPS mode in this embodiment, the main cell may have one of an FFS mode and a VA mode in another embodiment having a wide viewing angle.

The switching cell 350 is disposed over the main cell 310. The switching cell 350 includes a third substrate 352, a fourth substrate 354 a second liquid crystal layer 360 between the third and fourth substrates 352 and 354. A plurality of first electrodes 356 spaced apart from each other are formed on the third substrate 352, and a second electrode 358 having a plate shape is formed on the fourth substrate 354. Even though not shown in FIGS. 3A and 3B, a conductive line is further formed on the third substrate 352 to individually apply a voltage to the plurality of first electrodes 356. The plurality of first electrodes 356 and the second electrode 358 include a transparent conductive material such as indium-tin-oxide (ITO) and indium-zinc-oxide (IZO). The number and size of the plurality of first electrodes 356 may vary on the basis of object and property of the LCD device. In addition, the second electrode 358 may be formed as a plurality of second electrodes corresponding to the plurality of first electrodes 356.

Even though the switching cell 350 has a twisted nematic (TN) mode in this embodiment, in another embodiment the switching cell 350 may have an electrically controlled birefringence (ECB) mode using a vertical electric field. The LCD device further includes first, second and third polarizing films 332, 334 and 336. The first and third polarizing films 332 and 336 are formed on outer surfaces of the main cell 310 and the switching cell 350, respectively, and the second polarizing film 334 is formed between the main cell 310 and the switching cell 350.

Figure 4A:
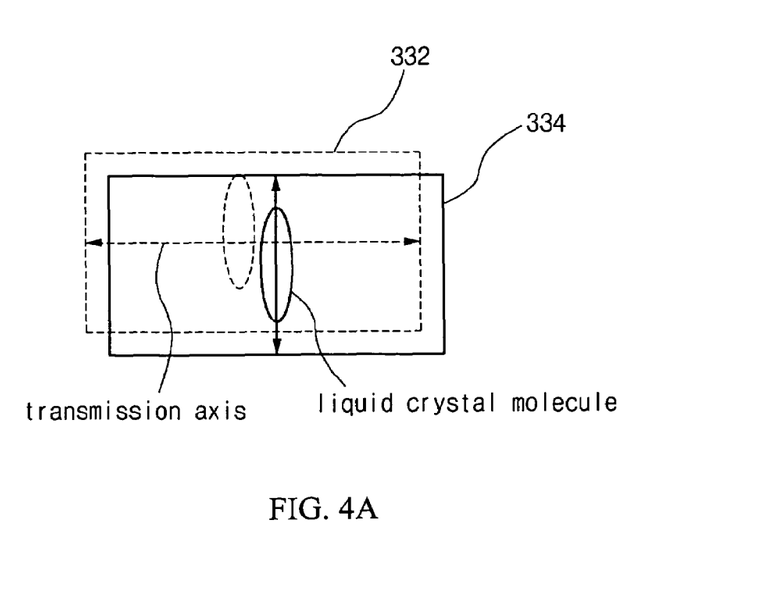
FIGS. 4A and 4B are views showing a rubbing direction and a transmission axis of a liquid crystal display device according to an embodiment of the present invention.
Figure 4B:
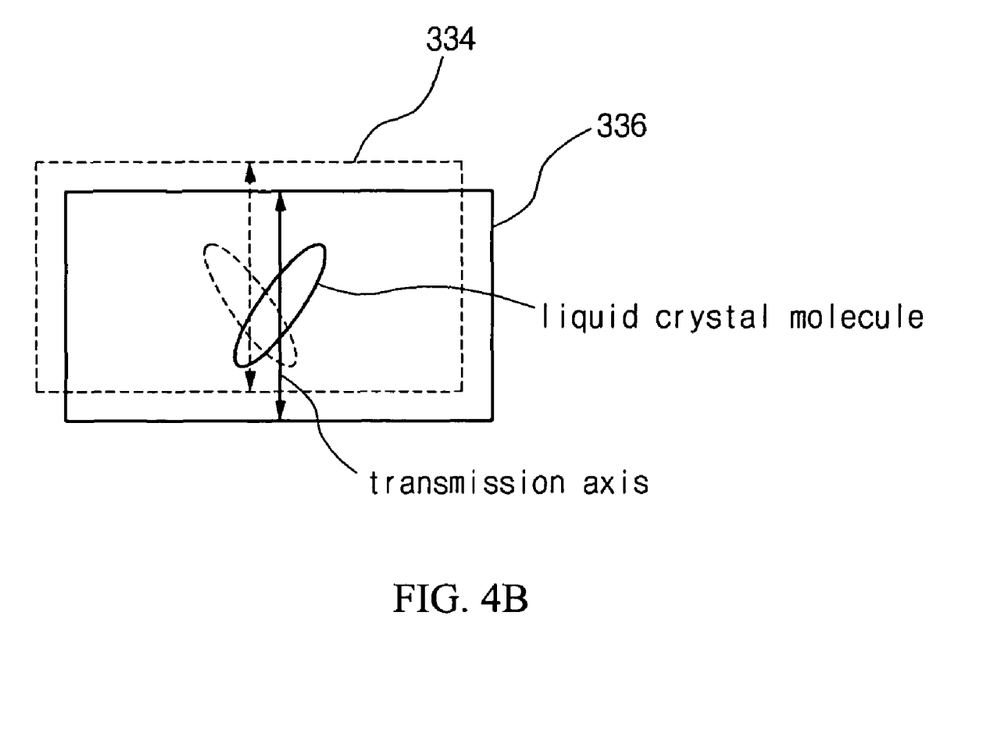

FIGS. 4A and 4B are views showing a rubbing direction and a transmission axis of a liquid crystal display device according to an embodiment of the present invention. In FIGS. 4A and 4B, directions are represented by an angle with respect to a positive x-axis of an xy coordinate system.

As shown in FIGS. 4A and 4B, the first polarizing film 332 on the outer surface of the main cell 310 (of FIG. 3A) has a transmission axis along a direction of 0°. In addition, the second polarizing film 334 between the main cell 310 (of FIG. 3A) and the switching cell 350 (of FIG. 3A) and the third polarizing film 336 on the outer surface of the switching cell 350 (of FIG. 3A) have transmission axes along a direction of 900. Accordingly, the transmission axis of the first polarizing film 332 crosses the transmission axis of the second polarizing film 334, and the transmission axis of the third polarizing film 336 is substantially parallel to the transmission axis of the second polarizing film 334.

The first liquid crystal layer 320 (of FIG. 3A) has a rubbing direction of 90° on the first substrate 312 (of FIG. 3A) and a rubbing direction of 270° on the second substrate 314 (of FIG. 3A). Accordingly, a liquid crystal molecule in the first liquid crystal layer 320 (of FIG. 3A) is initially aligned along a direction of 90° on the first substrate 312 (of FIG. 3A) and a direction of 270° on the second substrate 314 (of FIG. 3A). In addition, the liquid crystal molecule in the first liquid crystal layer 320 (of FIG. 3A) is initially aligned along a direction substantially parallel to one of the transmission axes of the first and second polarizing films 332 and 334 on the first and second substrates 312 and 314 (of FIG. 3A). When the main cell 310 (of FIG. 3A) has a VA mode, the liquid crystal molecule in the first liquid crystal layer 320 (of FIG. 3A) may be initially aligned along a vertical direction.

The second liquid crystal layer 360 (of FIG. 3A) has a rubbing direction of 135° on the third substrate 352 (of FIG. 3A) and a rubbing direction of 45° on the fourth substrate 354 (of FIG. 3A). Accordingly, a liquid crystal molecule in the second liquid crystal layer 360 (of FIG. 3A) is initially aligned along a direction of 135° on the third substrate 352 (of FIG. 3A) and a direction of 450 on the fourth substrate 354 (of FIG. 3A). In addition, the liquid crystal molecule in the second liquid crystal layer 360 (of FIG. 3A) is initially aligned along a direction of +45° on the third substrate 352 (of FIG. 3A) with respect to a transmission axis of the second and third polarizing films 334 and 336, and a direction of −45° on the fourth substrate 354 (of FIG. 3A) with respect to a transmission axis of the second and third polarizing films 334 and 336. The liquid crystal molecules in the second liquid crystal layer 360 (of FIG. 3A) are twisted by 90° from the third substrate 352 (of FIG. 3A) to the fourth substrate 354 (of FIG. 3A). As a result, the switching cell 350 (of FIG. 3A) has a normally black mode where a light is blocked and a black image is displayed when a voltage is not applied.

In the LCD device according to the present invention, the main cell 310 displays the first and second images at the same time and the switching cell 350 controls a main viewing angle of the first and second images by selectively applying a voltage to the plurality of first electrodes 356. As a result, the first and second images are displayed with different viewing angles.

Referring again to the main cell 310 of FIGS. 3A and 3B, gate signals are sequentially applied to a gate electrode of the TFT "T" through the gate line "GL" and data signals corresponding to the first and second images of a single horizontal line are applied to a source electrode of the TFT "T" through the data line "DL." The TFT "T" is turned on according to the gate signals, and the data signals are applied to the pixel electrode 372 through the TFT "T." Thus, an electric field is generated between the pixel electrode 372 and the common electrode 382 and the liquid crystal molecules in the first liquid crystal layer 320 are rearranged. The light transmittance of the main cell 310 is controlled according to the rearrangement of the liquid crystal molecules, thereby displaying the first and second images at the same time.

The data signals corresponding to the first and second images may be alternately applied to the pixel electrode 372 by a sub pixel region "SP" or by a pixel region "P." The pixel region "P" may include first, second and third sub pixel regions "SP1," "SP2" and "SP3" corresponding to red (R), green (G) and blue (B) color filters, respectively. The pixel region "P" may further include a fourth sub pixel region corresponding to a white (W) color filter. For example, when the data signals corresponding to the first and second images are alternately supplied by a sub pixel region "SP," the data signal corresponding to the first image may be applied to odd sub pixel regions and the data signal corresponding to the second image may be applied to even sub pixel regions. In addition, when the data signals corresponding to the first and second images are alternately supplied by a pixel region "P," the data signal corresponding to the first image may be applied to odd pixel regions each having the first to third sub pixel regions and the data signal corresponding to the second image signal may be applied to even pixel regions each having the first to third sub pixel regions.

In the switching cell 350, a voltage is selectively applied to the plurality of first electrodes 356 and the transmittance of the second liquid crystal layer 360 is adjusted by the voltage. Accordingly, the switching cell 350 controls the viewing angle of the main cell 310. The operation of the switching cell 350 will be illustrated with reference to drawings.

Figure 5A:
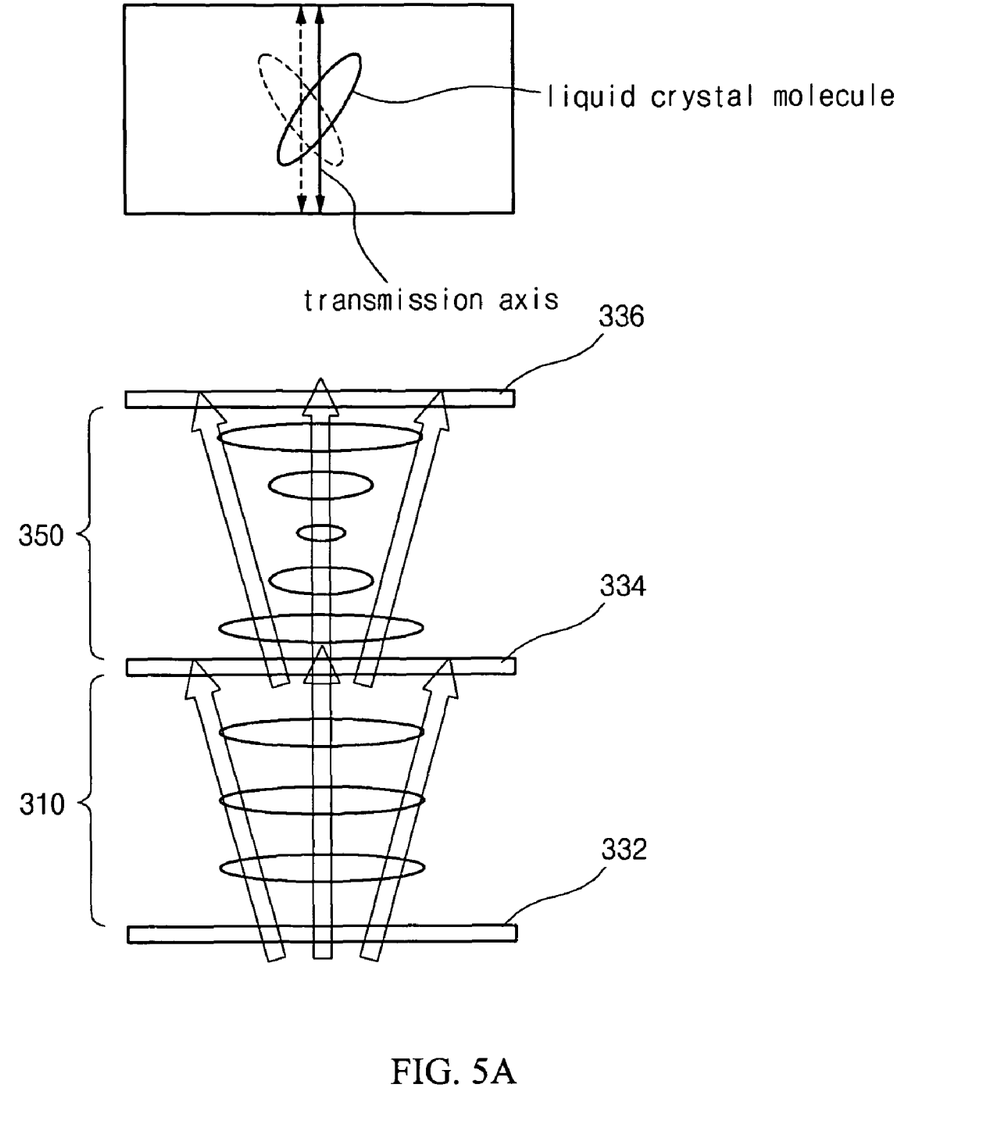
FIGS. 5A and 5B are views showing an operation of a switching cell of a liquid crystal display device according to an embodiment of the present invention.
Figure 5B:
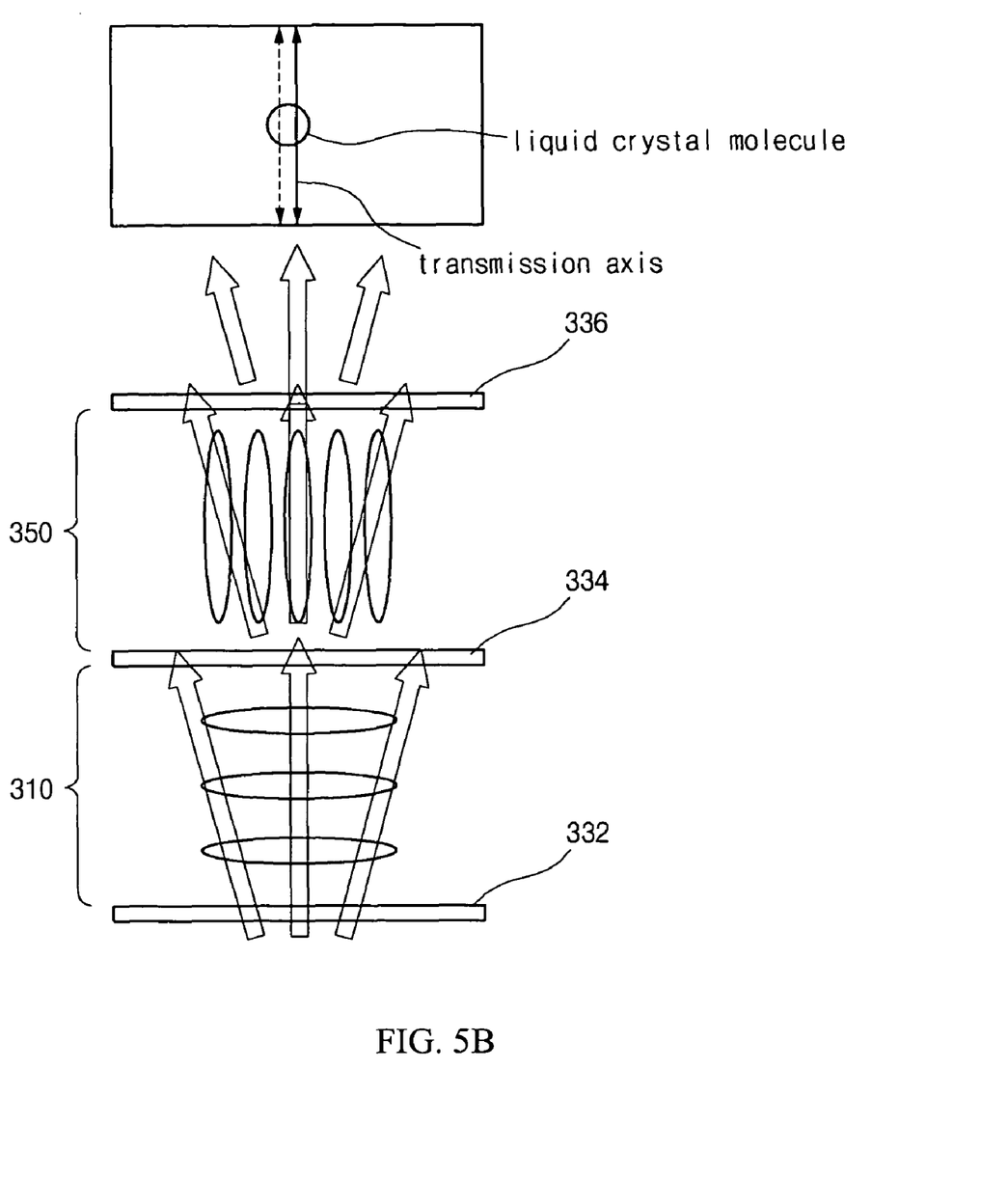

FIGS. 5A and 5B are views showing an operation of a switching cell of a liquid crystal display device according to an embodiment of the present invention. FIG. 5A shows the switching cell when a voltage is not applied to the plurality of first electrodes and FIGS. 5B shows the switching cell when a voltage is applied to the plurality of first electrodes.

In FIG. 5A, a voltage is not applied to the plurality of first electrodes 356 (of FIG. 3A) of the switching cell 350. Since the second and third polarizing films 334 and 336 have transmission axes substantially parallel to each other and the liquid crystal molecules in the second liquid crystal layer 360 (of FIG. 3A) are twisted by 90° from the third substrate 352 (of FIG. 3A) to the fourth substrate 354 (of FIG. 3A), light is not transmitted through the switching cell 350. As a result, images displayed in the main cell 310 are blocked by the switching cell 350.

In FIG. 5B, a voltage is applied to the plurality of first electrodes 356 (of FIG. 3A), and an electric field is generated between the plurality of first electrodes 356 (of FIG. 3A) and the second electrode 358 (of FIG. 3A). Since the second and third polarizing films 334 and 336 have transmission axes substantially parallel to each other and the liquid crystal molecules in the second liquid crystal layer 360 (of FIG. 3A) are vertically rearranged according to the electric field, light is transmitted through the switching cell 350. As a result, images displayed in the main cell 310 are transmitted through the switching cell 350.

The switching cell 350 transmits light when a voltage is applied to the plurality of first electrodes 356 (of FIG. 3A) and blocks light when a voltage is not applied to the plurality of first electrodes 356 (of FIG. 3A). In addition, a voltage can be selectively applied to the plurality of first electrodes 356 (of FIG. 3A). Accordingly, the switching cell 350 includes a transmissive area corresponding to a first region where a voltage is applied to the plurality of first electrodes 356 (of FIG. 3A) and a blocking area corresponding to a second region where a voltage is not applied to the plurality of first electrodes 356 (of FIG. 3A). For example, a voltage may not be applied to sequential m first electrodes and may be applied to sequential n first electrodes. The number m may be the same as the number n or may be different from the number n. Accordingly, the transmissive area and the blocking area having individually predetermined sizes may be alternately disposed with each other so that the blocking area can block the second image along a first direction and can block the first image along a second direction. In addition, since a substantial cell gap of the blocking area corresponds to a diagonal distance along the first direction or the second direction, the blocking area may have a size equal to or smaller than the transmissive area.

Figure 6A:
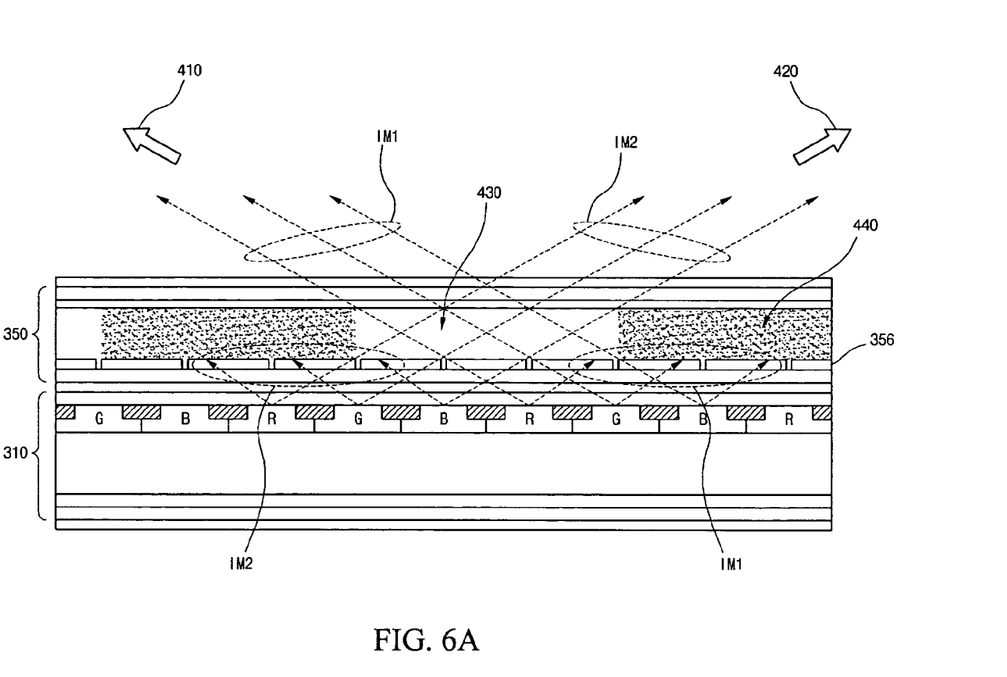
FIGS. 6A and 6B are cross-sectional views showing main viewing angles of a liquid crystal display device according to an embodiment of the present invention.
Figure 6B:
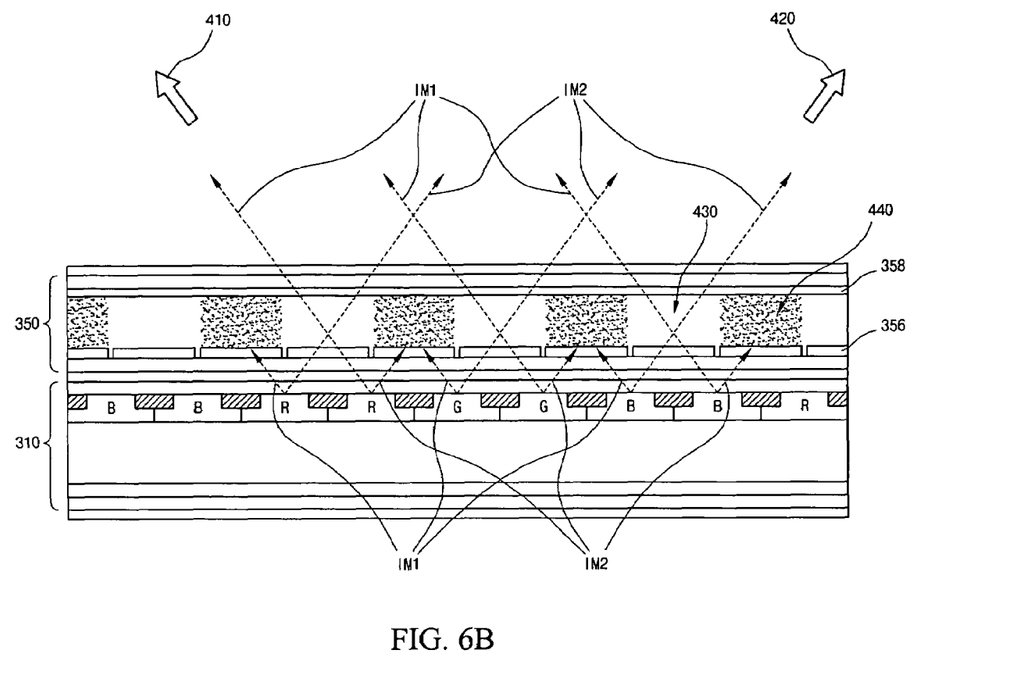

FIGS. 6A and 6B are cross-sectional views showing main viewing angles of a liquid crystal display device according to an embodiment of the present invention. FIG. 6A shows a liquid crystal display device where the blocking area and the transmissive area are alternately disposed by a pixel region, and FIG. 6B shows a liquid crystal display device where the blocking area and the transmissive area are alternately disposed by a sub pixel region.

In FIGS. 6A and 6B, a voltage is selectively applied to the plurality of first electrodes 356 and the switching cell 350 includes the transmissive area 430 and the blocking area 440 alternately disposed with each other. Accordingly, a first image "IM1" along a first direction 410 corresponds to the transmissive area 430 and a second image "IM2" along the first direction 410 corresponds to the blocking area 440. In addition, the first image "IM1" along the second direction 420 corresponds to the blocking area 440 and the second image "IM2" along the second direction 420 corresponds to the transmissive area 430. As a result, only the first image "IM1" is displayed along the first direction 410 and only the second image "IM2" is displayed along the second direction 420. The first and second images "IM1" and "IM2" have the first and second directions, respectively, as a main viewing angle due to the switching cell 350. Therefore, only a single image is displayed along one of the first and second direction.

The main viewing angles of the first and second images "IM1" and "IM2" may be controlled by sizes of the transmissive area 430 and the blocking area 440 and a cell gap of the switching cell 350. For example, as a width of the transmissive area 430 increases, the main viewing angles of the first and second images "IM1" and "IM2" with respect to a normal direction to a display surface of the liquid crystal display device increase. Accordingly, an angle between the main viewing angles of the first and second images "IM1" and "IM2" increases. In addition, as the cell gap of the switching cell 350 increases, the main viewing angles of the first and second images "IM1" and "IM2" with respect to the normal direction to the display surface of the liquid crystal display device decrease. Accordingly, an angle between the main viewing angles of the first and second images "IM1" and "IM2" decreases. Further, when the transmissive area 430 is disposed to be biased to one of the first and second directions 410 and 420, the main viewing angles of the first and second images "IM1" and "IM2" are not symmetric but are biased.

The sizes of the transmissive area 430 and the blocking area 440 are adjusted by a size of each first electrode 356 and a number of the plurality of first electrodes where the same voltage is applied. As the size of each first electrode 356 decreases, the main viewing angles are more easily controlled by a method of applying a voltage to the plurality of first electrodes 356.

Even though not shown in FIGS. 6A and 6B, the plurality of first electrodes 356 may be formed only in the transmissive area 430. Since the plurality of first electrodes 356 are not formed in the blocking area 440, a structure and a driving circuit of the switching cell 350 are simplified. An area where the plurality of first electrodes 356 are formed functions as the transmissive area 430 by simultaneously applying a voltage and the other area where the plurality of first electrodes 356 are not formed functions as the blocking area 440. As a result, the first and second images "IM1" and "IM2" are displayed along the first and second directions 410 and 420, respectively.

Consequently, a liquid crystal display device according to the present invention includes a main cell displaying first and second images at the same time and a switching cell controlling main viewing angles of the first and second images using a transmissive area and a blocking area. The transmissive area and the blocking area are determined by a size of an electrode and a cell gap of the switching cell. Accordingly, the first image is displayed along a first direction and the second image is displayed along a second direction different from the first direction.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a main cell comprising:
      a first substrate having a gate line, a data line, a thin film transistor and a pixel electrode;
      a second substrate facing the first substrate and having a black matrix and a color filter layer,
      wherein one of the first and second substrates has a common electrode; and
      a first liquid crystal layer between the first and second substrates,
      wherein first and second image datas are supplied to the main cell, and
      wherein the main cell simultaneously displays first and second images; and
   a switching cell over the main cell, the switching cell comprising:
      a third substrate having a plurality of first electrodes;
      a fourth substrates; facing the third substrate and having a second electrode; and
      a second liquid crystal layer between the third and fourth substrates,
      wherein the switching cell includes a transmissive area and a blocking area, and
      wherein the switching cell forms the transmissive area and the blocking area by selectively applying a voltage to the plurality of first electrodes so that the first and second images are alternately arranged with each other and have main viewing angles different from each other,
      wherein the second electrode is one of a plate shape covering an entire surface of the fourth substrate and a bar shape corresponding to the plurality of first electrodes,
      wherein the size of the blocking area is selectively adjusted by a number of the plurality of first electrodes to which the same voltage is applied, and
      wherein main viewing angles of the first and second images are adjusted according to a width of the blocking area.

2. The device according to claim 1, further comprising first, second and third polarization films, wherein the first polarizing film is formed on an outer surface of the main cell, the second polarizing film is formed between the main cell and the switching cell, and the third polarizing film is formed on an outer surface of the switching cell.

3. The device according to claim 2, wherein a transmission axis of the first polarizing film crosses a transmission axis of the second polarizing film and a transmission axis of the second polarizing film is substantially parallel to a transmission axis of the third polarizing film.

4. The device according to claim 2, wherein initial alignment directions of the second liquid crystal layer on the third and fourth substrates have an angle of 90° with respect to each other.

5. The device according to claim 4, wherein the initial alignment direction of the second liquid crystal layer on the third substrate has an angle of +45° with respect to a transmission axis of the second polarizing film and the initial alignment direction of the second liquid crystal layer on the fourth substrate has an angle of −45° with respect to a transmission axis of the third polarizing film.

6. The device according to claim 1, wherein the main cell has one of an in-plane switching mode, a fringe field switching mode and a vertical alignment mode.

7. The device according to claim 6, wherein initial alignment directions of the first liquid crystal layer on the first and second substrates are substantially parallel to one of transmission axes of the first and second polarizing films.

8. The device according to claim 6, wherein initial alignment directions of the first liquid crystal layer on the first and second substrates are substantially parallel to a direction from the first substrate to the second substrate.

9. The device according to claim 1, wherein the switching cell is one of a twisted nematic (TN) mode, and electrically controlled birefringence mode (ECB).

10. The device according to claim 1, wherein the plurality of first electrodes and the second electrode include one of indium-tin-oxide (ITO) and indium-zinc-oxide (IZO).

11. The device according to claim 1, wherein the gate line crosses the data line to define a sub pixel region, and three adjacent sub pixel regions constitute a pixel region.

12. The device according to claim 11, wherein the first and second images are alternately displayed by one of the sub pixel region and the pixel region.

13. The device according to claim 1, wherein main viewing angles of the first and second images are adjusted according to a thickness of the second liquid crystal layer in the blocking area.

14. The device according to claim 1, wherein the plurality of the first electrodes is selectively formed in the transmissive area.

15. The device according to claim 1, wherein the color filter layer includes first, second and third color filters sequentially arranged.

16. The device according to claim 1, wherein the color filter layer includes a pair of first color filters, a pair of second color filters and a pair of third color filters sequentially arranged.

17. A method of driving a liquid crystal display device, comprising:
   simultaneously displaying first and second images through a main cell wherein first and second image datas are supplied to the main cell,
   wherein the main cell includes a first substrate having a gate line, a data line, a thin film transistor and a pixel electrode, a second substrate facing the first substrate and having a black matrix and a color filter layer, wherein one of the first and second substrates has a common electrode, and a first liquid crystal layer between the first and second substrates; and
   forming a transmissive area and a blocking area in a switching cell located over the main cell by selectively applying a same voltage to a plurality of first electrodes so that the first and second images are alternately arranged with each other and have main viewing angles different from each other,
   wherein the switching cell includes a third substrate having the plurality of first electrodes, a fourth substrate facing the third substrate and having a second electrode, and a second liquid crystal layer between the third and fourth substrates,
   wherein the second electrode is one of a plate shape covering an entire surface of the fourth substrate and a bar shape corresponding to the plurality of first electrodes,
   wherein the size of the blocking area is selectively adjusted by a number of the plurality of first electrodes to which the same voltage is applied, and
   wherein main viewing angles of the first and second images are adjusted according to a width of the blocking area.

18. The method according to claim 17, wherein the main cell includes a sub pixel region and three adjacent sub pixel regions constitute a pixel region, and wherein the first and second images are alternately displayed by one of the sub pixel region and the pixel region.

19. The method according to claim 17, wherein a width of the blocking area is equal to or smaller than a width of the transmissive area.

20. The method according to claim 17, wherein the main viewing angles of the first and second images are adjusted according to a width of the blocking area.

21. The method according to claim 17, wherein the main viewing angles of the first and second images are adjusted according to a cell gap of the switching cell.

* * * * *